US008432576B2

(12) United States Patent
Washio

(10) Patent No.: US 8,432,576 B2
(45) Date of Patent: Apr. 30, 2013

(54) THRESHOLD MATRIX GENERATING DEVICE AND THRESHOLD MATRIX GENERATING METHOD

(75) Inventor: Koji Washio, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 362 days.

(21) Appl. No.: 12/841,610

(22) Filed: Jul. 22, 2010

(65) Prior Publication Data
US 2011/0019209 A1    Jan. 27, 2011

(30) Foreign Application Priority Data

Jul. 23, 2009  (JP) .................................. 2009-171768
Jun. 7, 2010  (JP) .................................. 2010-129779

(51) Int. Cl.
*G06F 15/00*  (2006.01)
*G06K 1/00*  (2006.01)

(52) U.S. Cl.
USPC ............................... 358/1.2; 358/1.1; 358/1.9

(58) Field of Classification Search ................ None
See application file for complete search history.

(56) References Cited

U.S. PATENT DOCUMENTS 4,149,194 A    4/1979  Holladay

FOREIGN PATENT DOCUMENTS

JP    8-163361    6/1996
JP    2008-227924    9/2008

*Primary Examiner* — Thierry Pham
(74) *Attorney, Agent, or Firm* — Finnegan, Henderson, Farabow, Garrett & Dunner, L.L.P.

(57) ABSTRACT

Disclosed is a threshold matrix generating device including a basic dot pattern generating unit for obtaining a basic dot pattern by carrying out a filter process by a convolution filter to an initial dot pattern in which dots are arbitrarily arranged, by obtaining a dot density of the dots included in the initial dot pattern and by repeating a process of moving dots to a pixel in which the dot density is smallest from a pixel in which the dot density is greatest and a threshold setting unit for generating a threshold matrix of a FM screen by increasing or decreasing dots from the basic dot pattern and by repeating a process of setting a threshold to a pixel in which the dots are increased or decreased, and the threshold matrix has a shape which is to be arranged in an oblique direction by having an angle.

5 Claims, 15 Drawing Sheets

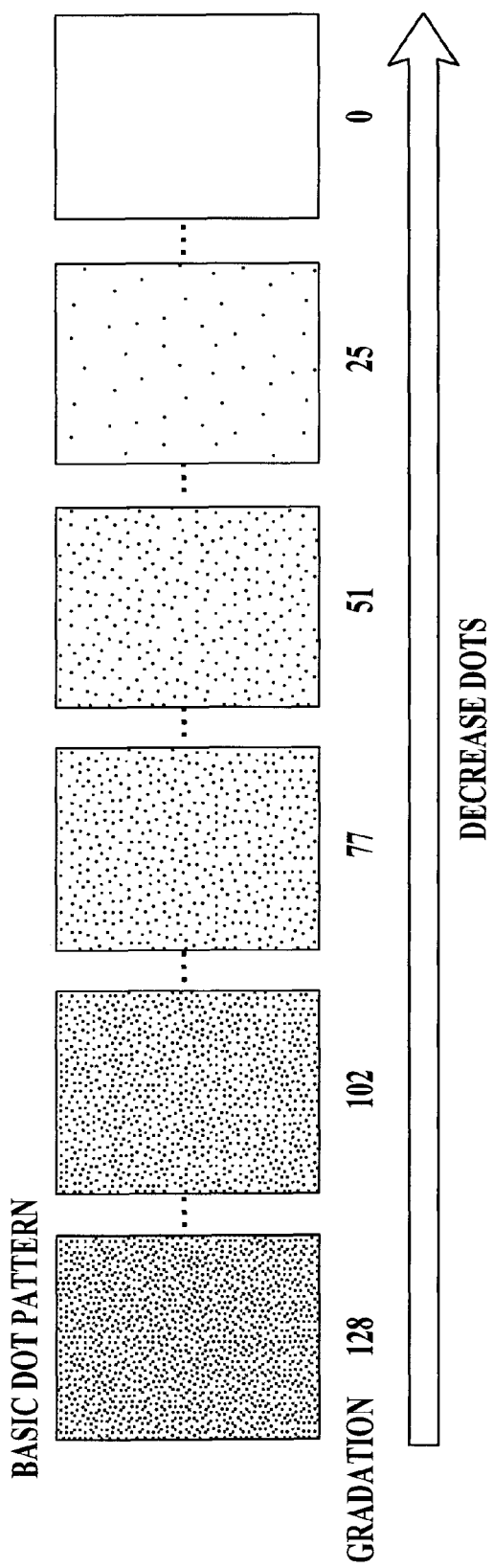

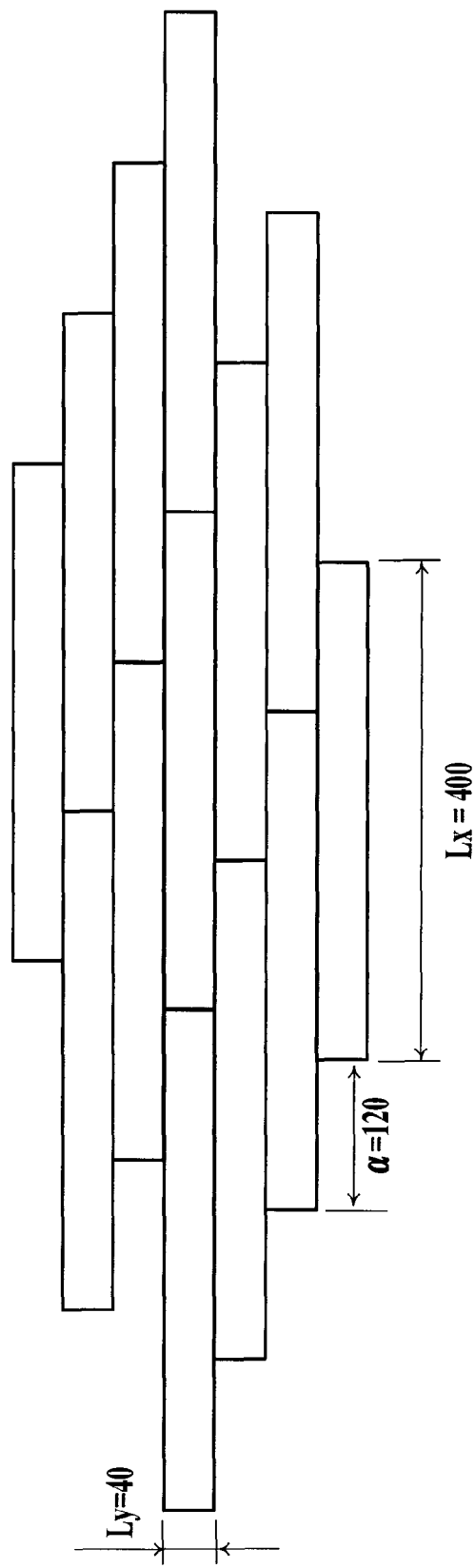

THRESHOLD MATRIX GENERATING DEVICE AND THRESHOLD MATRIX GENERATING METHOD

BACKGROUND OF THE INVENTION

1. Field of the Invention

The present invention relates to a threshold matrix generating device and a threshold matrix generating method.

2. Description of Related Art

As for techniques for expressing quasi-gradation by a stochastic dot pattern, called FM screen, the anneal technique, the VAC (Void And Cluster) technique, the BIPPSMA technique and the DBS technique are suggested, for example. These methods, except for the DBS method, are methods for generating a threshold matrix in size of M×N pixel. A technique for actually generating a binarized image by using the created threshold matrix is the dither method. The threshold matrix created by these threshold matrix generating methods have a shape of a square or a rectangle, and is arranged in a tiled arrangement in time of screen process of the dither method to be compared to an image which is targeted for the screen process.

When the screen process is carried out by using the threshold matrix which is generated in the above exemplified methods, there is a case where lines appear in a main scanning direction or in a sub-scanning direction in the processed image. The lines appear in vicinity of the boundary of each threshold matrix when the threshold matrix of M×N pixel is arranged. For example, the lines appear when brightness (dot density) slightly differs between neighboring threshold matrices or when the dots are arranged in the same direction in the vicinity of the boundary of each threshold matrix.

Whether the unevenness such as lines occurs or not depends on how the threshold matrix is generated. Therefore, as a fundamental method for solving the problem of unevenness, there is a need to review the process of generating the threshold matrix.

In general, unevenness can easily occur when the size of the threshold matrix is small. Therefore, it is preferred to use relatively large threshold matrix of 256×256 pixels. However, there is still a possibility that unevenness occur in the vicinity of the boundaries of the threshold matrices even when the size is made to be large.

Accordingly, there is disclosed a method to prepare a plurality of threshold matrices by reversing the threshold matrices in right to left and up and down so as to use threshold matrices which are randomly selected among the plurality of threshold matrices when carrying out the screen process by the dither method to make the unevenness be obscure (for example, see JP H8-163361). Further, there is disclosed a method of carrying out the screen process by using a large size threshold matrix which is created by attaching together a plurality of types of small size threshold matrices having different threshold array (for example, see JP 2008-227924).

In the method of JP H8-163361, an object is to obtain an effect where the dot pattern obtained by the threshold matrices can be seen evenly macroscopically by rotating the threshold matrices originally having unevenness which are generated by the conventional threshold matrix generating method and by randomly combining and using the threshold matrices in which threshold arrays are changed. However, unevenness of the dot pattern itself is not being removed. Therefore, when a threshold matrix having distinct unevenness is generated, the unevenness is highly visible after all. Thus, the method of JP H8-163361 is used in a case where threshold matrix having small unevenness is generated. Further, when threshold matrices having no association are randomly attached or when bilaterally symmetric threshold matrices or threshold matrices which are symmetry about top and bottom are randomly attached, unevenness in the vicinity of the boundary of the threshold matrices may be rather greater.

In the method of JP 2008-227924, it is assumed that the small size threshold matrix is a threshold matrix which generates an even dot pattern. A dot pattern of a certain gradation is generated by screen process from the small size threshold matrix, and the small size threshold matrix is arrange in a checkerboard pattern or in a flying knight pattern so as to arrange two of them horizontally and one vertically (or vice versa), for example, and the gaps are filled with an average value of the dot pattern, and then, the Fourier transformation is performed. A bandpass filter process is carried out in the Fourier transformation side so that frequency component caused by the size of the small size threshold matrix be preferably small, and thereafter, a dot pattern is generated by carrying out an inverse Fourier transformation. From this dot pattern, a seamless large size threshold matrix can be created.

However, only the unevenness pattern which occurs in a cycle of small size threshold matrix can be removed by the above method. For example, when there is unevenness pattern that occurs in a cycle of half of the cycle of the unevenness pattern of the small size threshold matrix or that occurs in a cycle of ⅓ of the unevenness pattern of the cycle of the small size threshold matrix or the like exists in the unevenness pattern of the small size threshold matrix, those unevenness cannot be removed. Further, even when the same threshold matrices are arranged in a checkerboard pattern (in a state where the threshold matrices are arranged by being shifted by one in main scanning direction and in sub-scanning direction) or in a flying knight pattern (in a state where the threshold matrices are arrange by being shifted by one in main scanning direction and by two in sub-scanning direction), the same dot pattern is repeated every other shift or every third shift in main scanning direction or in sub-scanning direction. Therefore, the cycle of unevenness becomes larger and the unevenness can be more distinct. Thus, even in the case of the method of JP 2008-227924, it is important how the small size threshold matrix which is to be used in the beginning is generated.

Other than the above described methods, screening process may be carried out by using a threshold matrix having the same size as the image. In such case, boundaries of the threshold matrices do not exist. Therefore, there is no such problem that the above described unevenness occurring in the vicinity of the boundaries of the threshold matrices. However, when the threshold matrix is attempted to be made in a size about a regular image, a great mount of time is needed to generate the threshold matrix and further, a great amount of storage capacity is needed because the generated threshold matrix is to be stored by being saved in a storage medium such as a memory. Even if the threshold matrix can be stored in a storage medium, the calculation time of the screen process becomes long and it is not impractical.

SUMMARY OF THE INVENTION

To achieve at least one of the abovementioned objects, a threshold matrix generating device reflecting one aspect of the present invention includes a basic dot pattern generating unit for obtaining a basic dot pattern by carrying out a filter process by a convolution filter to an initial dot pattern in which dots are arbitrarily arranged, by obtaining a dot density of the dots included in the initial dot pattern and by repeating a process of moving dots to a pixel in which the dot density is smallest from a pixel in which the dot density is greatest and a threshold setting unit for generating a threshold matrix of a FM screen by increasing or decreasing dots from the basic dot pattern and by repeating a process of setting a threshold to a pixel in which the dots are increased or decreased, and the threshold matrix has a shape which is to be arranged in an oblique direction by having an angle.

Preferably, by using an initial dot pattern having a shape which is to be arranged in an oblique direction by having an angle, the basic dot pattern generating unit obtains the basic dot pattern having the shape which is to be arranged in the oblique direction by having the angle, and by using the obtained basic dot pattern, the threshold setting unit generates the threshold matrix having the shape which is to be arranged in the oblique direction by having the angle.

Preferably, the basic dot pattern generating unit converts a shape of the initial dot pattern to a rectangular shape and also calculates a shift amount of a rectangular threshold matrix based on a size and an angle of the initial dot pattern having a shape which is to be arranged in an oblique direction by having an angle to obtain a rectangular basic dot pattern by using the converted rectangular initial dot pattern, and the threshold setting unit generates a rectangular threshold matrix which is to be used by being shifted for the calculated shift amount by using the obtained basic dot pattern.

Preferably, the convolution filter is a convolution filter of a bandpass filter or a convolution filter of a low pass filter.

BRIEF DESCRIPTION OF THE DRAWINGS

The present invention will become more fully understood from the detailed description given hereinbelow and the appended drawings, and thus are not intended as a definition of the limits of the present invention, and wherein:

FIG. 12 is a diagram showing each dot pattern obtained by decreasing dots and gradation value thereof;

FIG. 15 is a diagram showing an example where the threshold matrices which are converted to a rectangular shape are arranged by being shifted.

DESCRIPTION OF THE PREFERRED EMBODIMENTS

Hereinafter, an embodiment of the present invention will be described with reference to the drawings.

Figure 1:
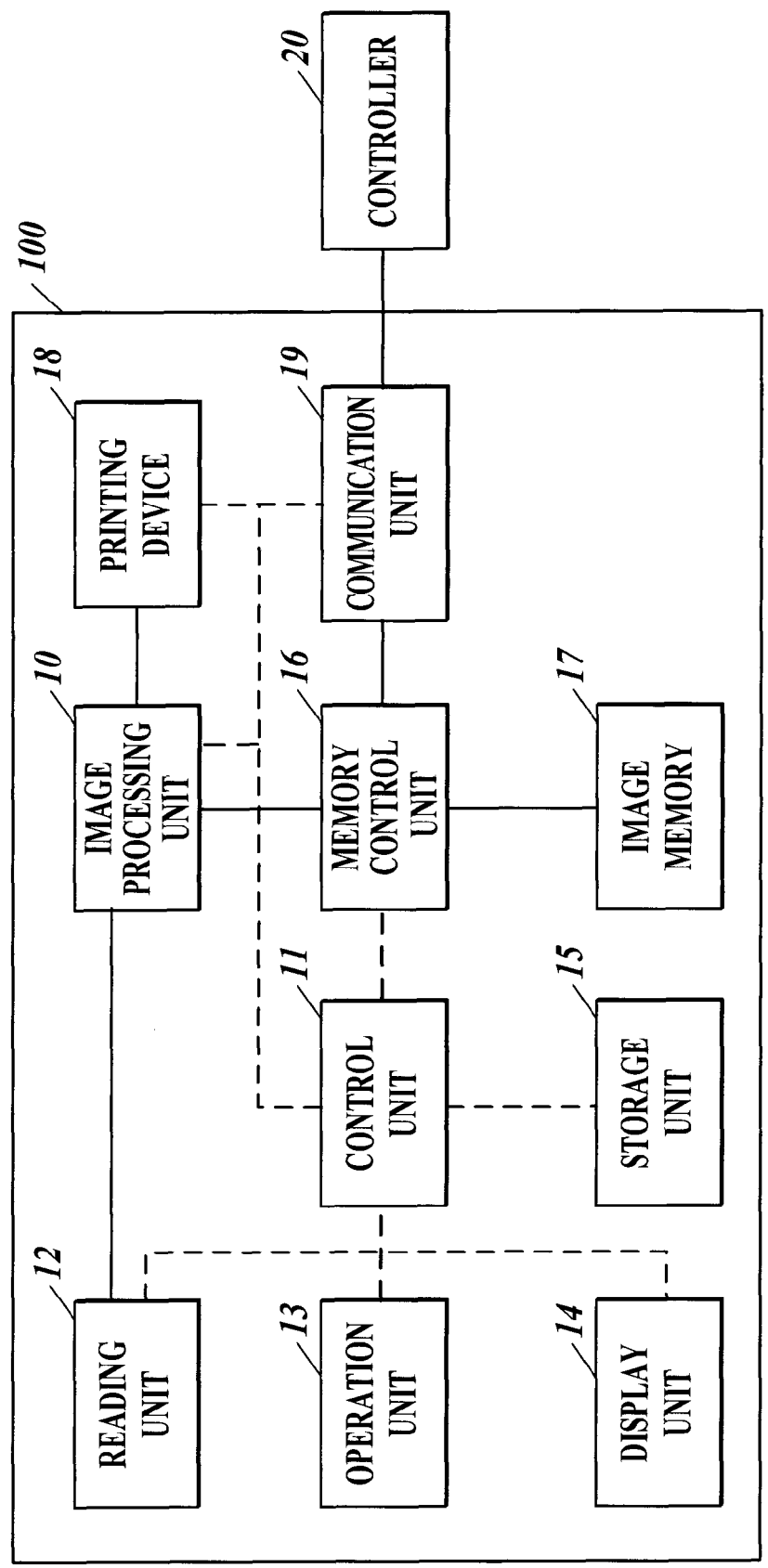
FIG. 1 is a diagram showing a functional structure of a MFP.

FIG. 1 shows a functional structure of a MFP (Multi Function Peripheral) 100. The MPF 100 is a composite-type image forming apparatus including a plurality of functions such as a copy function, a print function and the like.

As shown in FIG. 1, the MFP 100 is connected to a controller 20. The controller 20 rasterizes data of PDL (Page Description Language) format which is transmitted from the PC (personal computer) or the like as a print target to generate image data of bitmap format. The generated image data is transmitted to the communication unit 19 to be inputted to the MFP 100. The image data inputted to the MFP 100 is stored in the image memory 17. Here, the controller 20 may be structured so as to be embedded in the MFP 100.

As showing in FIG. 1, the MFP 100 includes an image processing unit 10, a control unit 11, a reading unit 12, an operation unit 13, a display unit 14, a storage unit 15, a memory control unit 16, an image memory 17, a printing device 18 and a communication unit 19.

The control unit 11 includes a CPU (Central Processing Unit), a RAM (Random Access Memory) and the like. The control unit 11 carries out various types of arithmetic operations by cooperating with various types of process programs which are stored in the storage unit 15 to integrally control each part of the MFP 100.

The reading unit 12 includes a scanner having an optical system and a CCD (Charge Coupled Device), and the reading unit 12 generates an analog image signal by carrying out optical scanning to a document. The generated image signal is outputted to the image processing unit 10.

The operation unit 13 is used to input an instruction of an operator, and the operation unit 13 includes various types of keys, a touch panel which is integrally structured with the display unit 14 and the like. The operation unit 13 generates an operation signal according to an input operation and outputs the generated operation signal to the control unit 11.

The display unit 14 displays an operation screen and the like on the display according to the control of the control unit 11.

The storage unit 15 stores parameters which are needed for processes, setting data and the like other than various types of programs. As for the storage unit 15, a hard-disk can be used.

The memory control unit 16 control input and output of image data to and from the image memory 17. For example, the memory control unit 16 stores image data which are inputted from the communication unit 19 and the image processing unit 10 in the image memory 17. Further, the memory control unit 16 reads out the image data which is instructed to be printed by the control unit 11 and outputs the read image data to the image processing unit 10.

The image memory 17 stores image data. As for the image memory 17, a DRAM (Dynamic RAM) can be used.

The printing device 18 carries out printing based on the image data for printing which is inputted from the image processing unit 10.

The printing device 18 carries out printing by electrographic method, and the printing device 18 includes a paper feeding unit, a light exposure unit, a development unit, a transfer unit, a fixing unit and the like, for example. At the time of printing, the light exposure unit irradiates laser beam on a photosensitive drum to form an electrostatic latent image according to a PWM signal obtained by carrying out the PWM (Plus Width Modulation) conversion to the image data. The development unit develops the electrostatic latent image by using a toner to form a toner image on the photosensitive drum. Then, the transfer unit transfers the toner image on a paper which is fed from the paper feeding unit and the fixing unit fixes the toner image.

The communication unit 19 includes an interface for communication and carries out communication with the controller 20. The communication unit 19 receives the image data of the print target from the controller 20 and outputs the image data to the memory control unit 16.

Next, the image processing unit 10 will be described with reference to FIG. 2.

The image processing unit 10 carries out various types of correction processes such as luminance correction and color conversion process to the analog image signal which is inputted from the reading unit 12. Further, the image processing unit 10 carries out digital conversion to the analog image signal to generate digital image data and outputs the generated digital image data to the memory control unit 16. The image data is stored in the image memory 17 by the memory control unit 16.

Thereafter, the image data which is stored in the image memory 17 is read out and the image date is outputted to the image processing unit 10 when there is a printing instruction from the control unit 11. The image processing unit 10 carries out image processes needed for printing such as γ correction process for correcting density of the image and screen process for binarizing the pixel value of the image to the image data to generate image data for printing. FIG. 2 shows component parts of the image processing unit 10 which mainly function at the time of generation of image data for printing.

Figure 2:
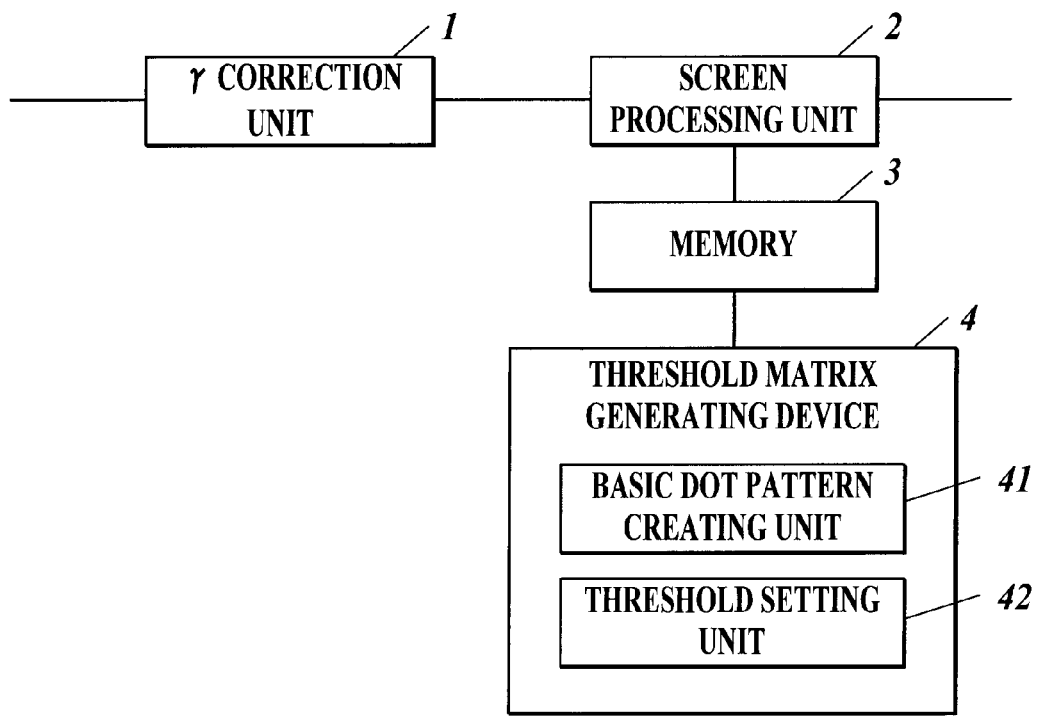
FIG. 2 is a diagram showing a part of a structure of an image processing unit including a threshold matrix generating device according to the embodiment.

As shown in FIG. 2, the image processing unit 10 includes a γ correction unit 1, a screen processing unit 2, a memory 3 and a threshold matrix generating device 4.

The γ correction unit 1 carries out γ correction process to the inputted image data. The γ correction process converts the pixel value of each pixel of the inputted image data to the pixel value of after correction by using the LUT (look-up table) in which output pixel values of after correction with respect to input pixel values are defined. The image data to which the γ correction process is carried out is outputted to the screen processing unit 2.

The screen processing unit 2 carries out the screen process by the dither method by using the threshold matrix of FM screen stored in the memory 3 to the image data inputted from the γ correction unit 1 and binarizes each pixel value. In the screen process, the screen processing unit 2 arranges the threshold matrices by scanning the image and compares the pixel value of each pixel of the image with the threshold which is set to the threshold matrices, and the screening processing unit 2 binarizes the pixel values according to whether the pixel value is equal or greater than the threshold.

The memory 3 stores the threshold matrix created by the threshold matrix generating device 4.

Figure 3:
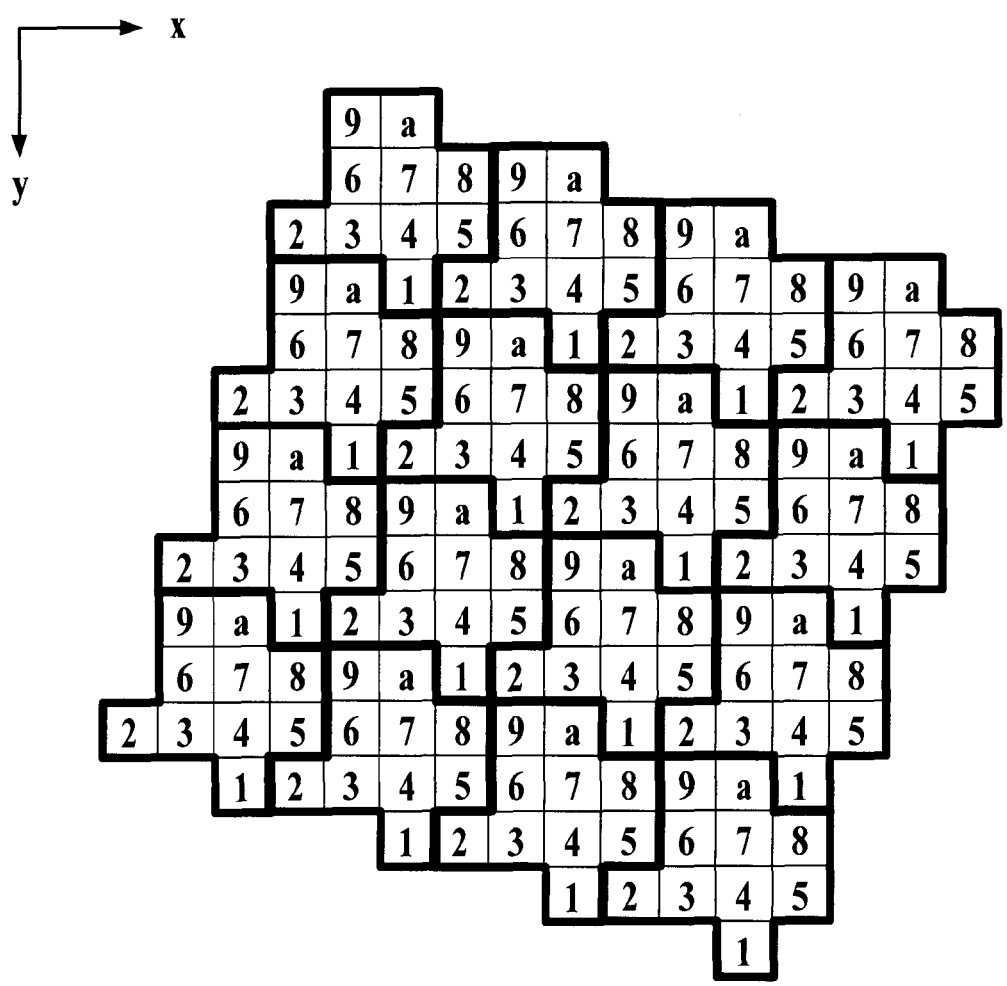
FIG. 3 is a diagram showing an arrangement example of threshold matrices.

The threshold matrix generating device 4 includes a basic dot pattern generating unit 41 and a threshold setting unit 42, and creates the threshold matrix of FM screen. The created threshold matrix has a shape which is to be arranged in an oblique direction by having an angle when the threshold matrices are arranged in the image. FIG. 3 shows an example in which above described threshold matrices are arranged. In FIG. 3, x indicates the main scanning direction of the image and y indicates the sub-scanning direction of the image. Further, symbols 1 to 9 and a indicating the pixel position are respectively attached to each pixel of the threshold matrices.

In FIG. 3, for simplifying the description, relatively small size threshold matrix having a size of 10 pixels is exemplified. However, when the size of the threshold matrix is too small, a stochastic dot arrangement cannot be obtained. When expressing the size of the threshold matrix, that is the total number of pixels, by S, a size about $S \geqq 256$ is preferable. When S is smaller than 256, unevenness which occur in a cycle of threshold matrix arranged in an oblique direction may be distinct. Therefore, a large size threshold matrix in which the threshold matrix of size 10 as shown in FIG. 3 is made to be 30 times larger, for example, is actually generated.

Hereinafter, a threshold matrix generating method by the threshold matrix generating device 4 will be described.

A threshold matrix is generated by the VAC (Void And Cluster) method. The VAC method is a method suggested by R. Ulichney and is a method to eliminate unevenness of dot distribution by repeatedly processing the dot pattern which is a seed.

Figure 4:
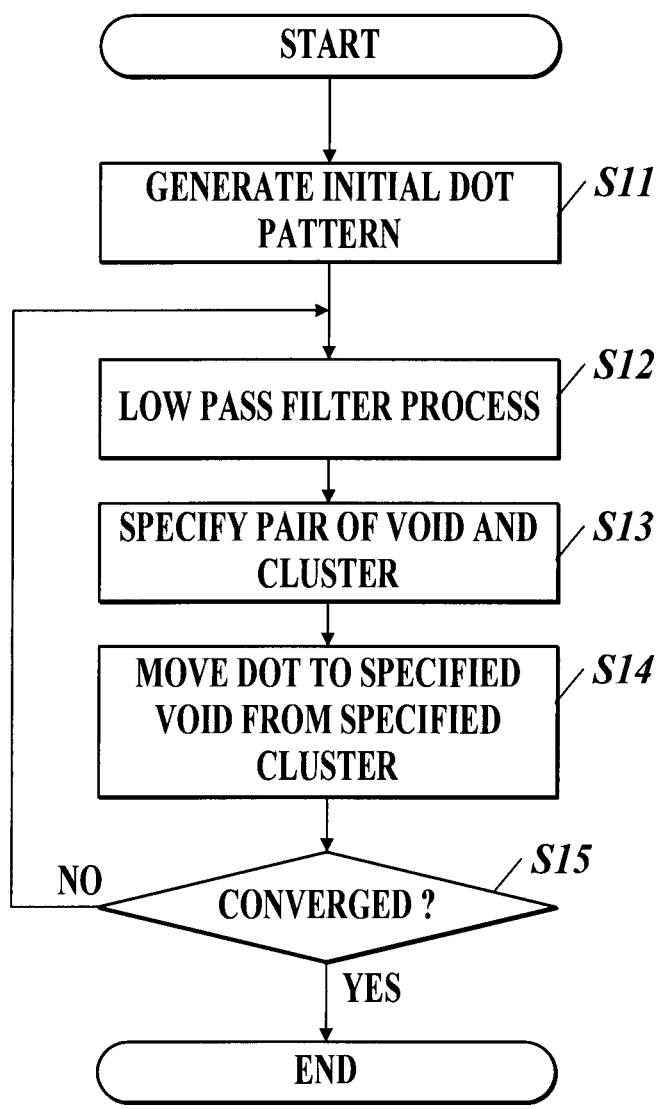
FIG. 4 is a flowchart showing a generating process of a basic dot pattern.

First, the basic dot pattern generating unit 41 generates a basic dot pattern in which dots are evenly distributed. FIG. 4 is a flowchart showing a generating process of a basic dot pattern by the basic dot pattern generating unit 41.

As shown in FIG. 4, the basic dot pattern generating unit 41 generates a dot pattern in which dots are arbitrarily arranged (step s11). The generated dot pattern is called an initial dot pattern.

The initial dot pattern has a size and a shape same as the threshold matrix to be generated. That is, the shape of the initial dot pattern is a shape which is to be arranged in an oblique direction by having an angle when arranged in an image. Such shape is a shape which is generally used in AM screen. In similar way as in the case of designing the shape of threshold matrix of AM screen, the shape can be designed from the angle of the oblique direction in which the threshold matrix is to be arranged and the size of the threshold matrix (that is, size of the initial dot pattern).

Figure 5:
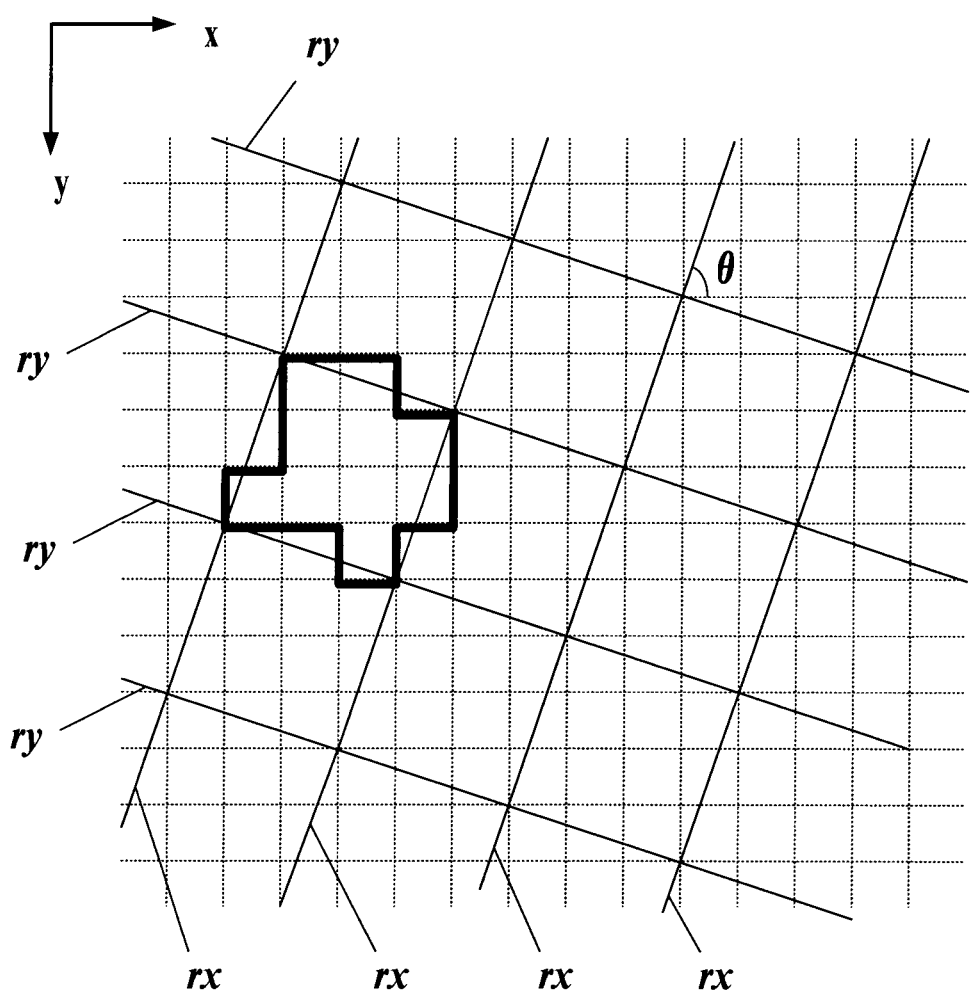
FIG. 5 is a diagram for explaining a designing method of a shape which is to be arranged in an oblique direction by having an angle.

For example, when designing the threshold matrices shown in FIG. 3, as shown in FIG. 5, square cells arranged in the oblique direction having angle θ are formed by straight lines rx and ry. The straight lines rx and ry are decided so that the intersection thereof positions at the apex of each pixel. Further, the positions of the straight lines rx and ry are decided so that the number of pixels in the cell becomes the size of the threshold matrix to be obtained. The pixels in the cell which is formed as described above structures the threshold matrix.

According to the above method, by adjusting the angle θ and the size of the cell, threshold matrix of various types of shapes can be designed as shapes where the threshold matrix is to be arranged in an oblique direction by having an angle.

Figure 6A:
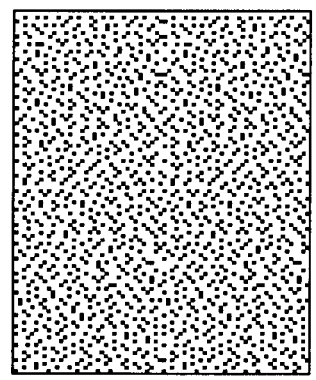
FIG. 6A is a diagram showing an arrangement example of dots in an initial dot pattern.

The dots which are to be arranged in the initial dot pattern may be decided by generating random numbers and by arranging the dots in the pixel positions where random numbers are generated. Alternatively, an initial dot pattern in which dots are arbitrarily arranged may be generated by carrying out an error diffusion process to an image of a certain gradation. Further, a cluster dot and a Bayer-type screen pattern may be stored in the memory 3, and the cluster dots and the Bayer-type screen pattern may be read out to be used as the initial dot pattern. FIG. 6A shows an example of dot arrangement in the initial dot pattern. The main scanning direction of the initial dot pattern is expressed by x and the sub-scanning direction of the initial dot pattern is expressed by y.

Next, the basic dot pattern generating unit 41 scans the initial dot pattern to obtain dot density of the dots included in the initial dot pattern. Then, the basic dot pattern generating unit 41 searches for the pixel in which the dot density is the greatest (this is called cluster) and the pixel in which the dot density is the smallest (this is called void). In order to search, the threshold matrix generating device 4 carries out the low pass filter process to the initial dot pattern (step S12) and specifies the pixel having the greatest value in the initial dot pattern after the process as the cluster and specifies the pixel having the smallest value in the initial dot pattern after the process as the void (step S13). Here, a bandpass filter process of a specific frequency may be carried out instead of the low pass filter process. When the low pass filter is used, one dot can be obtained from one pixel. However, when the bandpass filter is used, one dot can be obtained from number of pixels and the dot diameter can be made large.

When the low pass filter process is carried out to the initial dot pattern, considering the periodicity of the threshold matrix, a corrected convolution filter is used as shown in the following formula 1.

$$p_f(x, y) = \sum_{m=-M_x/2}^{M_x/2} \sum_{n=-M_y/2}^{M_y/2} p(m', n')\psi(m, n), \quad (1)$$

Figure 7:
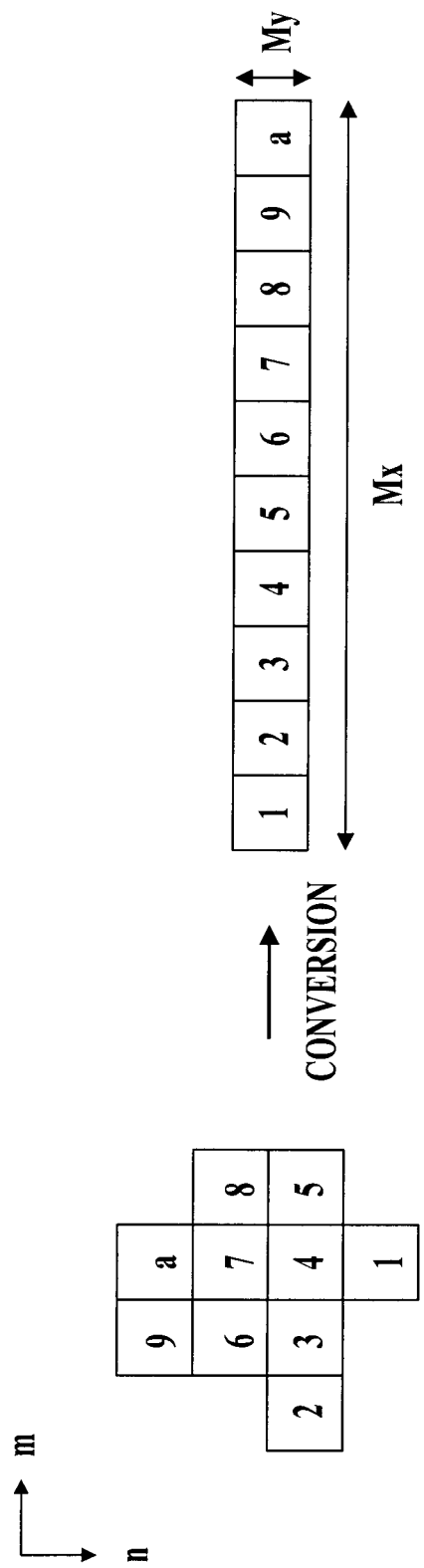
FIG. 7 is a diagram for explaining a length of a threshold matrix.

In the above formula 1, p (x, y) indicates a dot pattern and $p_f$(x, y) indicates a dot pattern to which the filter process is carried out. Further, $\Psi$(x, y) indicates the filter function of the low pass filter. Mx and My indicates the length of the threshold matrix, and as shown in FIG. 7, the length in x direction when the threshold matrix is converted to a rectangular shape is Mx and the length in y direction when the threshold matrix is converted to a rectangular shape is My. The method to convert the threshold matrix to a rectangular method is same as the after-mentioned conversion method.

Further, in formula 1, (m, n) indicates the position coordinate in the threshold matrix and m' and n' are expressed by the following formulas 2 and 3. In the formula, mod is a residual operator and (a)mod(b) indicates to obtain the residual of (a) divided by (b).

$$m'=(M_x+x-m) \bmod M_x \quad (2)$$

$$n'=(M_y+y-n) \bmod M_y \quad (3)$$

That is, when carrying out scanning in x direction and y direction of the dot pattern in the filter process, a correction is made so that the scanning is to be repeated in the dot pattern p(x, y), in other words, so that the scanning is to be repeated in the cycle (Mx, My) of the threshold matrix.

As the low pass filter, it is preferred to use the filter function of Gaussian type as shown in the following formula 4.

$$\psi(x,y)=\exp[-(x^2+y^2)^{1/2}(2\sigma^2)] \quad (4)$$

Figure 8A:
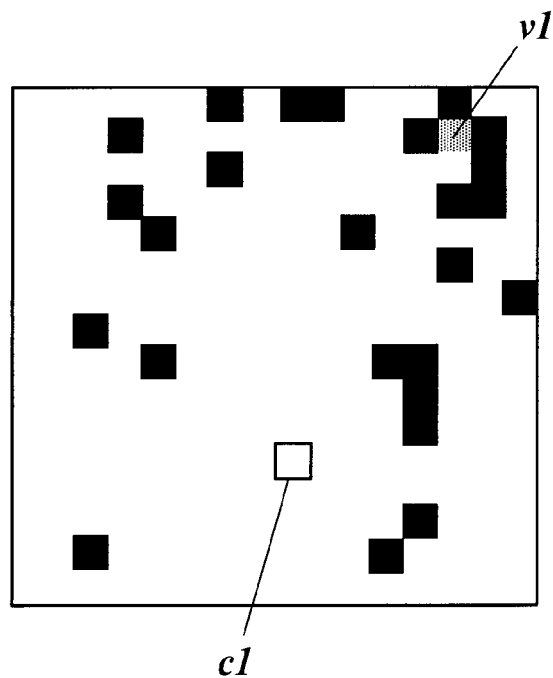
FIG. 8A is a diagram showing an example of a void and a cluster specified in a dot pattern.
Figure 8B:
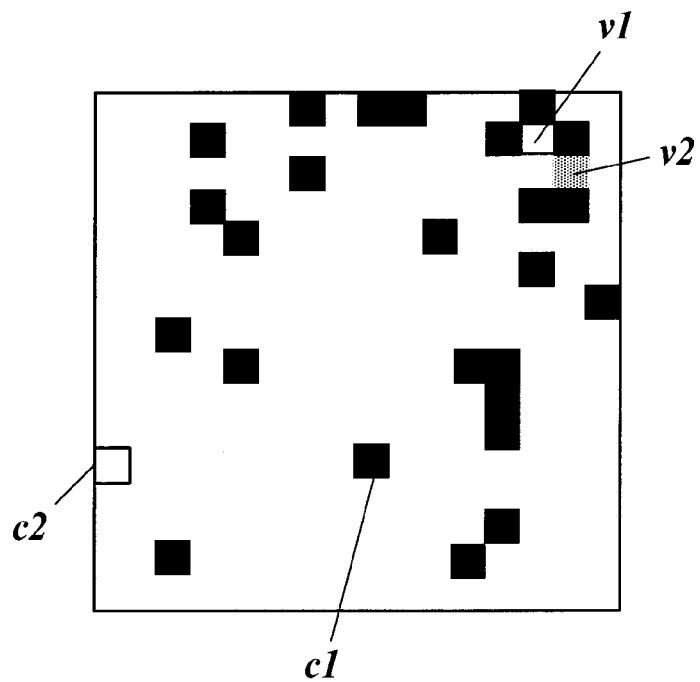
FIG. 8B is a diagram showing an example of a void and a cluster specified in the dot pattern after dots are moved.

When a pair of void and cluster is specified in the initial dot pattern, the basic dot pattern generating unit 41 moves the dots to the specified cluster from the specified void (step S14). For example, when a pair of void v1 and cluster c1 is specified as shown in FIG. 8A, the dots which are arranged in the void v1 are to be moved to the cluster c1. As a result, the void v1 becomes a white point in which dots are not arranged as shown in FIG. 8B, and the cluster c1 becomes a black point in which dots are arranged.

The basic dot pattern generating unit 41 specifies a void and a cluster by carrying out the low pass filter to the dot pattern which is obtained by moving the dots, and repeats the process of steps S12 to S14 of moving the dots (step S15; NO). For example, as shown in FIG. 8B, with respect to the dot pattern which is obtained by moving the dots to the cluster c1 from the void v1, the void v2 and the cluster c2 are further specified and the dots are moved to the cluster c2 from the void v2.

As a result of repeating the process of steps S12 to S14, when a void and a cluster are not found in the dot pattern, that is, when the dot pattern has converged to a state where the dot distribution is not biased (step S15; Y), the basic dot pattern generating unit 41 stores the finally obtained dot pattern in the memory 3 as the basic dot pattern and the process shown in FIG. 4 is finished. Here, the threshold matrix generating device 4 may be provided with an inner memory and the basic dot pattern may be stored on the inner memory.

Figure 6B:
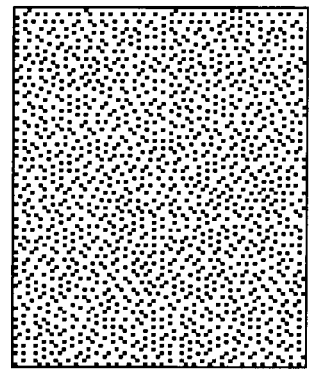
FIG. 6B is a diagram showing an arrangement example of dots in a basic dot pattern.

FIG. 6B shows an example of a dot arrangement of the basic dot pattern obtained from the initial dot pattern shown in FIG. 6A. As shown in FIG. 6B, the dot distribution in the basic dot pattern is more even comparing to the dot distribution in the initial dot pattern.

Figure 9:
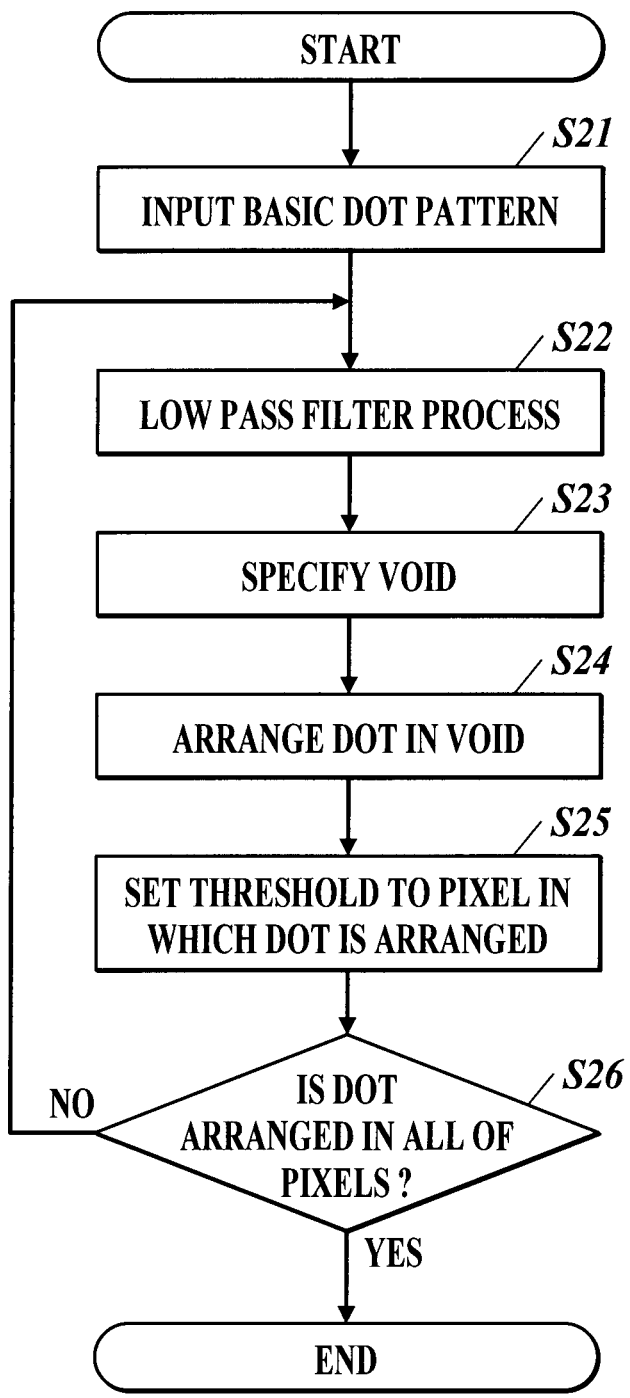
FIG. 9 is a flowchart showing a process for setting a threshold by increasing dots.
Figure 10:
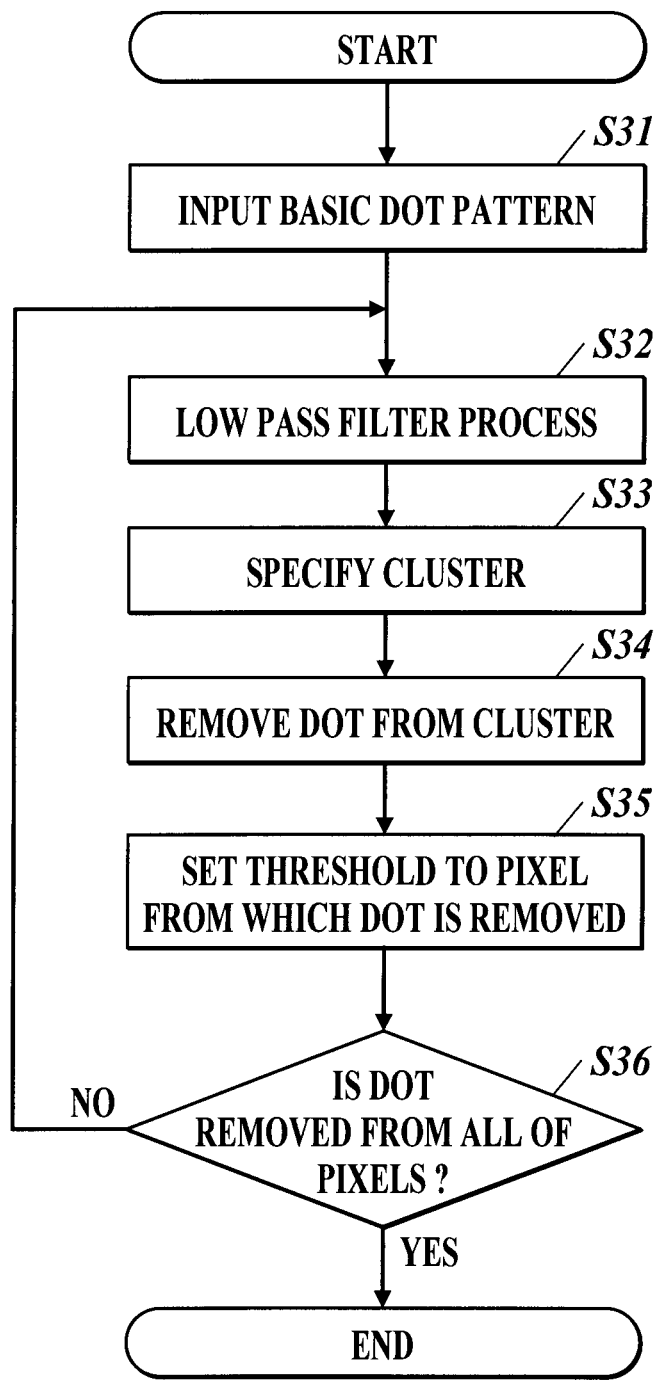
FIG. 10 is a flowchart showing a process for setting a threshold by decreasing dots.

When the basic dot pattern is obtained in a way described above, the threshold setting unit 42 increases or decrease the dots one by one or a plurality of dots at a time from the basic dot pattern to set a threshold. FIG. 9 is a flowchart showing a process for setting the threshold by increasing dots, and FIG. 10 is a flowchart showing a process for setting the threshold by decreasing dots.

As shown in FIG. 9, the threshold setting unit 42 reads out the basic dot pattern from the memory 3 to input (step S21).

The threshold setting unit 42 carries out the low pass filter process to the basic dot pattern (step S22) and specifies a void (step S23). The content of the low pass filter process and the specifying process of void are as described above.

The threshold matrix generating device 4 newly arranges dots in the specified void (step S24) to increase dots. At this time, not only one void but a plurality of voids may be specified, and the dots may be increased one by one or a plurality of dots at a time to the one void or the plurality of voids which is specified. Next, the threshold setting unit 42 calculates and sets a threshold which corresponds to the pixel in which dots are increased based on the number of dots included in the dot pattern just before the dots are increased (step S25).

For example, in a case where the 256 gradation is expressed by a threshold matrix and where the gradation value of the basic dot pattern is 128, the total number of pixels of the basic dot pattern is 1000 and the number of dots included in the basic dot pattern is 500, when the number of dots included in the dot pattern just before the dots are increased is 750, the threshold of the pixel in which dots are increased is to be calculated as 128×750/500=192.

Next, the threshold setting unit 42 determines whether dots are arranged for all of the pixels or not (step S26). When dots are not arranged in all of the pixels of the dot pattern yet and when voids still exist (step S26; N), the threshold setting unit 42 repeatedly executes the process of steps S22 to S25 to the dot pattern which is obtained by increasing dots in step S24 to set a threshold to a pixel in which dots are increased every time the dots are increased.

Figure 11:
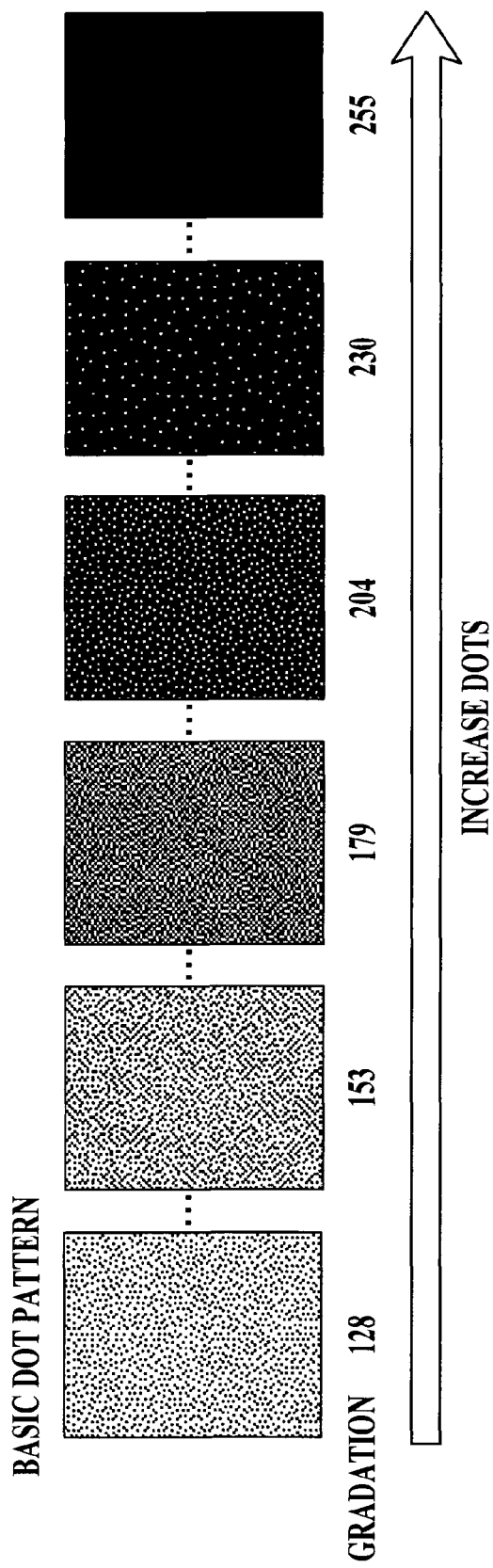
FIG. 11 is a diagram showing each dot pattern obtained by increasing dots and gradation value thereof.

By repeating the process of steps S22 to S25, dots increase by setting the basic dot pattern as a seed as shown in FIG. 11. Eventually, when a dot pattern in which dots are arranged in all of the pixels (the dot pattern of 255 gradation shown in FIG. 11) is obtained (step S26; Y), the process of FIG. 9 is finished. In case of the above described example, the number of dots included in the basic dot pattern is 500. Therefore, a threshold is to be set for the remaining 500 pixels in which dots are not arranged.

In the process shown in FIG. 10, a process similar to the above described process is carried out while decreasing dots inversely to the above described process.

As shown in FIG. 10, when the threshold setting unit 42 inputs the basic dot pattern (step S31), the threshold setting unit 42 carries out the low pass filter process (step S32) to specify a cluster in the basic dot pattern (step S33). The content of the low pass filter process and the specifying method of cluster are as described above.

The threshold setting unit 42 deletes the dots which are arranged in the specified cluster (step S34) to decreased dots. At this time, not only one cluster but a plurality of clusters may be specified, and dots may be decreased one by one of a plurality of dots at a time from the specified one cluster or the plurality of clusters. Next, the threshold setting unit 42 calculates and sets a threshold corresponding to the pixel in which the dots are decreased based on the number of dots included in the dot pattern just before the dots are decreased (step S35).

For example, in a case where the 256 gradation is expressed by a threshold matrix and where the gradation value of the basic dot pattern is 128, the total number of pixels in the basic dot pattern is 1000 and the number of dots included in the basic dot pattern is 500, when the number of dots included in the dot pattern just before the dots are decreased is 125, the threshold of the pixel is to be calculated as 128×125/500=64.

Next, the threshold setting unit 42 determines whether dots are deleted for all of the pixels or not (step S36). In a case where dots are not yet deleted from all of the pixels in the dot pattern and when clusters still exist (step S36; N), the threshold setting unit 42 repeatedly executes the process of steps S32 to S35 to the dot pattern which is obtained by the dots being deleted to set a threshold to a pixel in which dots are decreased every time dots are decreased.

By repeating the process of steps S32 to S35, dots decrease by setting the basic dot pattern as a seed as shown in FIG. 12. Eventually, when a dot pattern in which dots are deleted from all of the pixels (the dot pattern of 0 gradation shown in FIG. 12) is obtained (step S36; Y), the process of FIG. 10 is finished. In case of the above described example, the number of dots included in the basic dot pattern is 500. Therefore, threshold is to be set for the 500 pixels in which dots are arranged.

The threshold is set to each pixel in the way described above, and the created threshold matrix is outputted to the memory 3 and is stored.

Figure 13A:
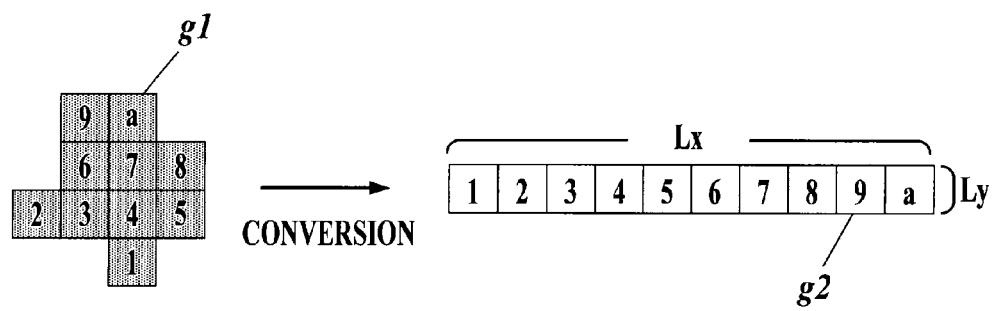
FIG. 13A is a diagram showing a threshold matrix in a shape which is to be arranged in an oblique direction by having an angle and a threshold matrix in which its shape is converted to a rectangular shape.
Figure 13B:
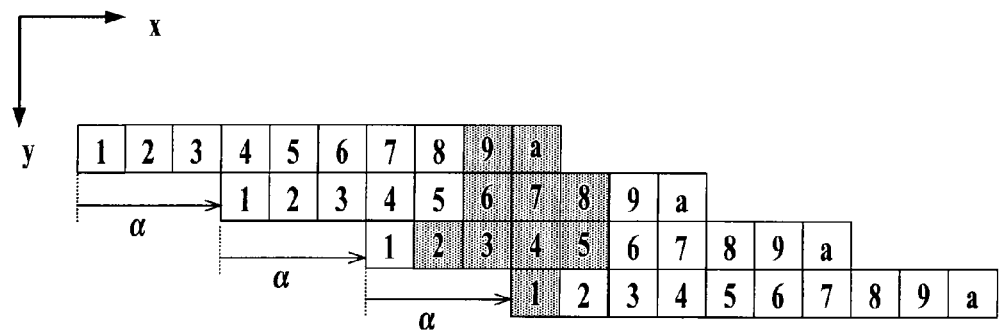
FIG. 13B is a diagram showing an example where the threshold matrices which are converted into a rectangular shape are arranged by being shifted.

Here, according to the algorithm of Thomas M. Holladay (see U.S. Pat. No. 4,149,194), the threshold matrix having a shape as shown in FIG. 3 can be replaced with a rectangular threshold matrix to be used and not using the threshold matrix having a shape as shown in FIG. 3 as it is to an image in the screen process. For example, as shown in FIG. 13A, the threshold matrix g1 not having a rectangular shape which is arranged in an oblique direction by having an angle is converted into a rectangular threshold matrix g2. As shown in FIG. 13B, by arranging the converted threshold matrices g2 to the image by shifting for a predetermined shift amount α, a threshold alignment same as the threshold matrix g1 can be realized. The threshold matrix having a rectangular shape as the threshold matrix g2 has a better processing efficiency of the screen process, and the same processing result as the case where the threshold matrix g1 is used to the image can be obtained.

In such way, when the threshold matrix is to be replaced with a rectangular threshold matrix, a threshold matrix is to be generated by using the shape of the replaced threshold matrix, that is, the rectangular initial pattern. The calculation for generating the threshold matrix is easier when it is in a rectangular shape and the process efficiency is improved. Here, in the above FIGS. 13A and 13B, an example of a small size threshold matrix with 10 pixels in total is exemplified for simplifying the description. However, because it is preferred that the size S≧256 as described above, a threshold matrix having size of S≧256 is actually generated.

Hereinafter, a method for converting the threshold matrix g1 into a rectangular threshold matrix g2 will be described by using the threshold matrix g1 and g2 shown in FIG. 13A as examples. This converting method is by the algorithm of Thomas M. Holladay (see U.S. Pat. No. 4,149,194).

According to the algorithm of Holladay, first, the lengths Lx, Ly and the shift amount α of the rectangular threshold matrix g2 are calculated based on the size S of the threshold matrix g1 and the angle θ at the time when the threshold matrix g1 is arranged.

Figure 14:
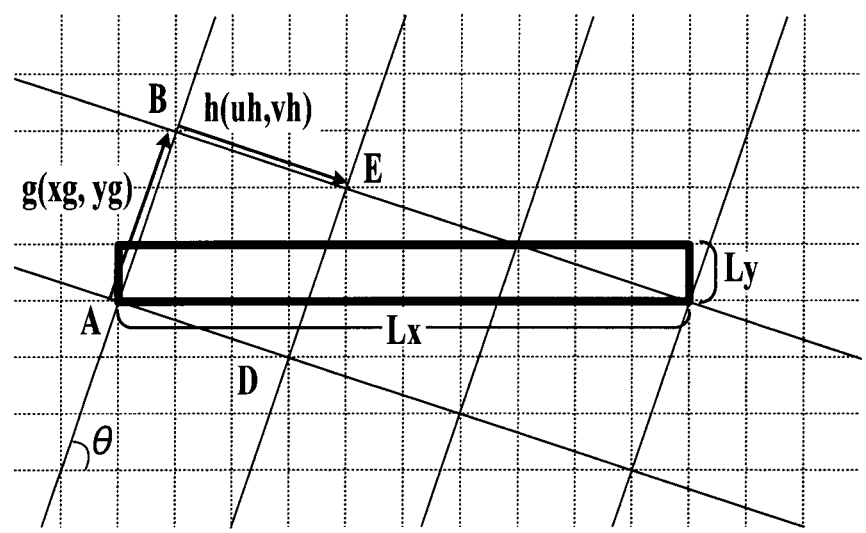
FIG. 14 is a diagram for explaining a conversion method to a rectangular shape.

As shown in FIG. 14, the square ABED of an area S (expressed in number of pixels) corresponding to the threshold matrix g1 is obtained. When the straight line in the direction of A→B is expressed in a vector g $(x_g, y_g)$ and when the straight line in the direction of B→E is expressed in a vector h $(u_h, v_h)$, the area S can be obtained by the following formula 7.

$$S = x_g^2 + y_g^2 \quad (7)$$

Next, $x_g$ and $y_g$ are expressed in the smallest integer ratio. When setting the integers at the time so as to be a and b, the length Lx of the threshold matrix g2 can be obtained by the following formula 8.

$$Lx = ax_g + by_g \quad (8)$$

Here, $b/a = y_g/x_g$ and b/a is a rational number.

Next, the greatest common denominator of $y_g$ and $x_g$ is obtained as the length Ly of the threshold matrix g2.

Lastly, the shift amount α is obtained by the following formula 9.

$$\alpha = Lx - (k \cdot S + x_g \cdot Ly)/y_g \quad (9)$$

Here, k is an integer number.

As shown in FIG. 14, one side of the square ABED is $\sqrt{10}$ and the angle θ is tan θ=b/a=3/1, θ=72°. Therefore, the following can be obtained; $x_g = \sqrt{10} \cos 72° = 1$, $y_g = \sqrt{10} \sin 72° = 3$, Lx=1×1+3×3=10 and Ly=1. The shift amount α is α=10−(k×10+1×1)/3, and for example, it can be obtained that α=3 when k=2 so that a will be an integer number.

The positional relation between the thresholds of the threshold matrix g1 and g2 of before conversion and after conversion can be obtained as follows. As shown in FIG. 13A, the layout position of the threshold of the rectangular threshold matrix g2 is shown by symbols 1 to 9 and a, and as shown in FIG. 13B, the threshold matrices g2 are to be arranged by being shifter for the shift amount α each. When this arrangement of the threshold matrices g2 is marked off by cells of the square ABED as shown in FIG. 14, the threshold matrices g1 which are repeatedly align in the same threshold arrangement appear. Therefore, the positional relation between the thresholds between the threshold matrices g1 and the threshold matrices g2 can be specified from the symbols indicating the pixel positions of the threshold matrix g1.

When the initial dot pattern is to be generated by the generating process of the basic dot pattern shown in FIG. 4, the basic dot pattern generating unit 41 converts the shape of the initial dot pattern having a shape which is to be arranged in an oblique direction by having an angle to a rectangular shape by the above described conversion method to a rectangular shape, and also, the basic dot pattern generating unit 41 calculates the shift amount α of the rectangular threshold matrix and generates the rectangular basic dot pattern from the converted rectangular initial dot pattern. The threshold setting unit 42 is to generate the threshold matrix to be used by being shifted by the calculated shift amount α, which is a rectangular threshold matrix, from the basic dot pattern.

Here, when the threshold matrix is generated by using the converted rectangular initial pattern, m' and n' expressed in the formulas 2 and 3 are replaced with the following formulas 5 and 6. This is to take into consideration that the rectangular threshold matrices are to be arrange by being shifted.

$$m' = (Lx + x - (y \times a)/Ly) \bmod Lx \quad (5)$$

$$n' = y \bmod Ly \quad (6)$$

In the above formulas 5 and 6, Lx and Ly indicate the lengths of the rectangular threshold matrix, and Lx is the length in x direction and Ly is the length in y direction.

According to the above described conversion method to a rectangular shape, threshold matrices of various sizes and having various angles can be converted to a rectangular shape. For example, when converting the threshold matrix in which the angle θ is tan θ=b/a=3/1, corresponding to a square ABED in which one side is about 130 pixels, it is θ=a tan 2=72° and the following can be obtained; $x_g$=130 cos 72°=40, $y_g$=130 sin 72°=120. The rectangular threshold matrix after conversion can be obtained as Lx=1×40+3×120=400 and Ly=40 because a:b=1:3, $x_g$=40 and $y_g$=120. Further, the shift amount α is α=400−(k×16000+40×40)/120 because S=400×40=16000, and when k=2, for example, so that α is an integer number, α can be obtained as α=400−840/3=120.

The screen processing unit 2 arranges the threshold matrices having a size of 400×40 which are converted to a rectangular shape so as to be next to each other in x direction as shown in FIG. 15 and compares the threshold with the pixel value of the image while scanning the image and binalizes the pixel value. When a scanning of one line in x direction is finished, the threshold matrix is shifted in y direction, and the threshold matrix is further shifted for the shift amount α=120 in x direction and starts scanning in x direction from the shifted position. In such way, by shifting the threshold matrix in x direction only for the shift amount α every time when scanning in x direction is finished and shifted in y direction, the screen processing which is similar to a case where the threshold matrix before being converted to a rectangular shape is used to an image can be executed.

As described above, according to the embodiment, the basic dot pattern generating unit 41 carries out the low pass filter process to the initial dot pattern in which dots are arbitrarily arranged by the convolution filter, and the basic dot pattern generating unit 41 generates the basic dot pattern by repeating the process of moving dots to the void in which the dot density of the dots included in the initial dot pattern is the smallest from the cluster in which the dot density of the dots included in the initial dot pattern is the greatest. The threshold setting unit 42 increases or decreases dots from the generated basic dot pattern, and the threshold setting unit 42 repeats the process to set a threshold to the pixel in which dots are increased or decreased every time the dots are increased or decreased to generate the threshold matrix of FM screen.

A basic dot pattern in which dots are evenly distributed can be obtained and the threshold matrix can be generated from the basic dot pattern, thereby, a threshold matrix which generates a dot pattern having little unevenness can be provided. Further, because the threshold matrix has a shape which is to be arranged in an oblique direction by having an angle, therefore, when the threshold matrices are arranged in an image, the threshold matrices will not be lined up in one direction of the main scanning direction or the sub-scanning direction. Even when unevenness occurs in vicinity of the boundaries between neighboring threshold matrices, the unevenness do not continue in one direction and the unevenness is cut off, therefore, the unevenness can be avoided from being distinct by the unevenness being like lines. Thereby, a threshold matrix in which unevenness is hard to spot can be provided.

In case of AM screen, because bulks of dots formed by the threshold matrix are aligned cyclically, moiré (interference fringe) can occur easily. Therefore, the shape of the threshold matrix is designed in a shape which is to be arranged in an oblique direction by having an angle to reduce occurrence of moiré. On the other hand, there is no directionality and periodicity in the dot alignment in FM screen, therefore, a problem such as moiré in AM screen does not occur. Therefore, FM screen was not made to be in a shape which is to be arranged in an oblique direction. However, when the threshold matrices of FM screen are arranged in one direction of main scanning direction or sub-scanning direction as in conventional case, there is a possibility that the unevenness which occur in vicinity of the boundaries between the threshold matrices continue and be distinct as lines. Further, in a case where there is much unevenness in the threshold matrix itself, the unevenness is to appear cyclically. On the other hand, according to the embodiment, by making the unevenness in the threshold matrix so as to be small as possible as described above and by designing the threshold matrix so as to be arranged in an oblique direction, the unevenness can be made to be hard to spot.

Here, the above embodiment is a preferable example of the present invention, and the present invention is not limited to the above embodiment.

In the above embodiment, an example where the threshold matrix generating device 4 is mounted in the MFP 100 and where the threshold matrix which is generated by the threshold matrix generating device 4 is provided to the screen processing unit 2 is shown. However, there is a case where the screen process is carried out to the image data which is generated in the controller 20 and where the MFP 100 prints the image data which is inputted from the controller 20 as it is in order to increase efficiency of the operation. In such case, the threshold matrix generating device 4 may be mounted in the controller 20.

Moreover, in the above embodiment, the threshold matrix is generated by the VAC method. However, the method is not limited to the VAC method, and the anneal method, the BIPPSMA method and other analogous methods may be used as long as the threshold matrix which is to be arranged obliquely is to be generated. It is much anticipated by a person skilled in the art that similar effects can be obtained from these other methods.

Alternatively, the threshold matrix generating device of the present invention may be mounted in an information processing apparatuses such as a PC and the like. The threshold matrix can be generated in the information processing apparatus, and data of the generated threshold matrix data can be transmitted to the MFP 100.

Further, the process of generating the threshold matrix by the threshold matrix generating device according to the present invention may be programmed to be installed in the information processing apparatuses such as a PC. As a computer readable medium of the program, a ROM (Read Only Memory), a non-volatile memory such as a flash memory and a portable recording medium such as CD-ROM can be used.

Moreover, a carrier-wave can be applied to the present invention as a medium which provides data of the program via a communication circuit.

The entire disclosures of Japanese Patent Application No. 2009-171768 filed on Jul. 23, 2009 and Japanese Patent Application No. 2010-129779 filed on Jun. 7, 2010 are incorporated herein by reference in its entirety.

What is claimed is:

1. A threshold matrix generating device, comprising:
 a basic dot pattern generating unit for obtaining a basic dot pattern by carrying out a filter process by a convolution filter to an initial dot pattern in which dots are arbitrarily arranged, by obtaining a dot density of the dots included in the initial dot pattern and by repeating a process of moving dots to a pixel in which the dot density is smallest from a pixel in which the dot density is greatest; and
 a threshold setting unit for generating a threshold matrix of a FM screen by increasing or decreasing dots from the basic dot pattern and by repeating a process of setting a threshold to a pixel in which the dots are increased or decreased, wherein
 the threshold matrix has a shape which is to be arranged in an oblique direction by having an angle.

2. The threshold matrix generating device of claim 1, wherein
 by using an initial dot pattern having a shape which is to be arranged in an oblique direction by having an angle, the basic dot pattern generating unit obtains the basic dot pattern having the shape which is to be arranged in the oblique direction by having the angle, and
 by using the obtained basic dot pattern, the threshold setting unit generates the threshold matrix having the shape which is to be arranged in the oblique direction by having the angle.

3. The threshold matrix generating device of claim 1, wherein
 the basic dot pattern generating unit converts a shape of the initial dot pattern to a rectangular shape and also calculates a shift amount of a rectangular threshold matrix based on a size and an angle of the initial dot pattern having a shape which is to be arranged in an oblique direction by having an angle to obtain a rectangular basic dot pattern by using the converted rectangular initial dot pattern, and
 the threshold setting unit generates a rectangular threshold matrix which is to be used by being shifted for the calculated shift amount by using the obtained basic dot pattern.

4. The threshold matrix generating device of claim 1, wherein the convolution filter is a convolution filter of a bandpass filter or a convolution filter of a low pass filter.

5. A threshold matrix generating method, comprising:
 obtaining a basic dot pattern with a basic dot pattern generating unit by carrying out a filter process by a convolution filter to an initial dot pattern in which dots are arbitrarily arranged, by obtaining a dot density of the dots included in the initial dot pattern and by repeating process of moving dots to a pixel in which the dot density is smallest from a pixel in which the dot density is greatest; and
 generating a threshold matrix of a FM screen with a threshold setting unit by increasing or decreasing dots from the basic dot pattern one by one or a plurality of dots at a time and by repeating a process of setting a threshold to a pixel in which the dots are increased or decreased, wherein
 the threshold matrix has a shape which is to be arranged in an oblique direction by having an angle.

* * * * *